United States Patent Office 3,082,045
Patented Mar. 19, 1963

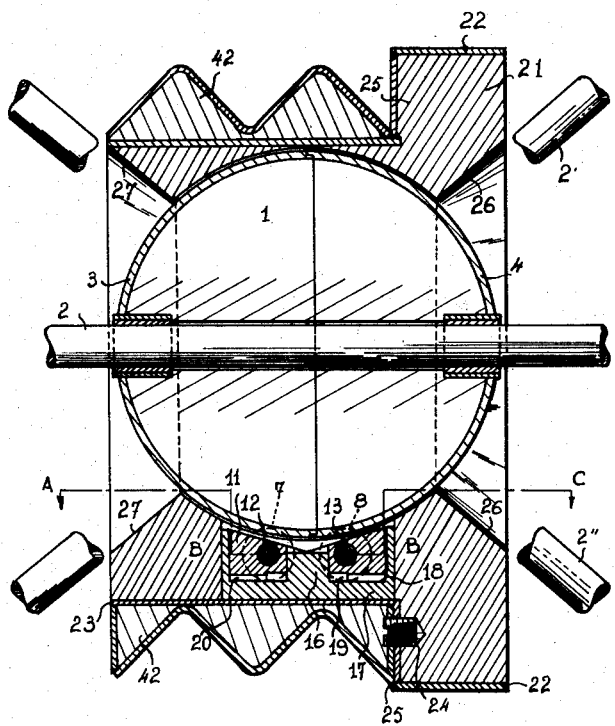
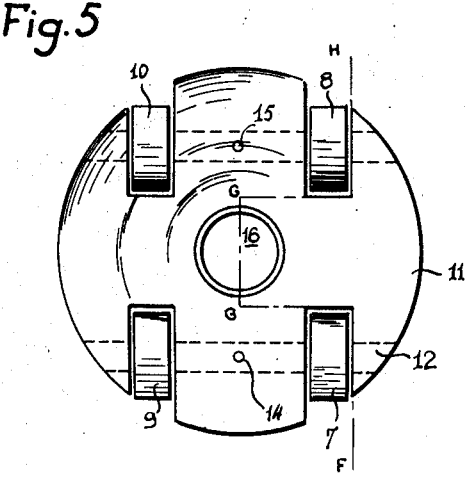
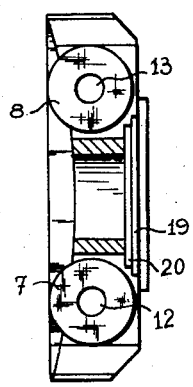
Fig.1
Fig.5
Fig.6

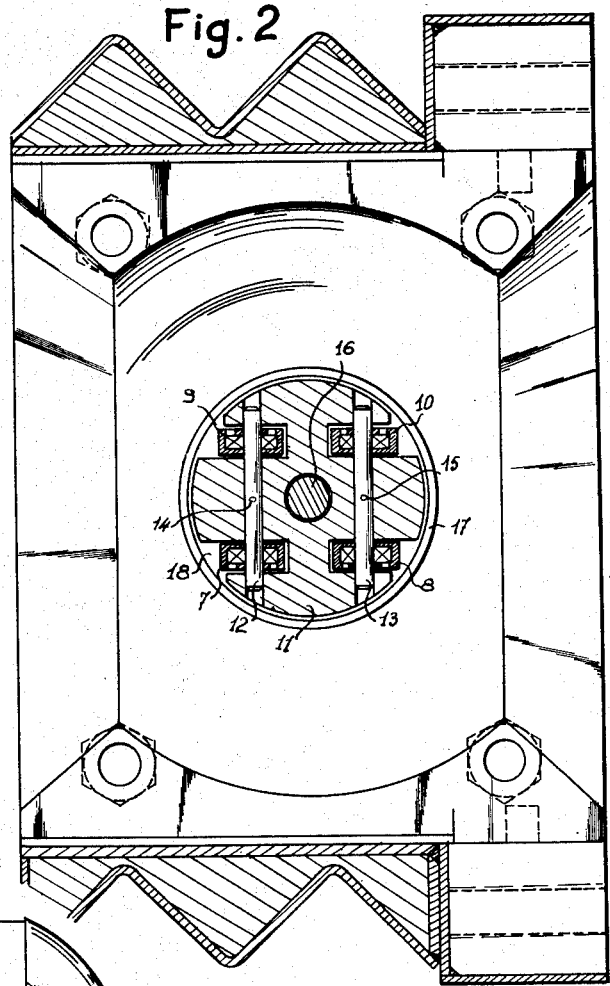
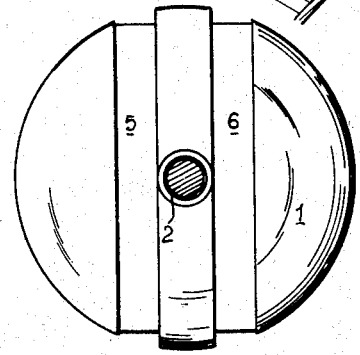

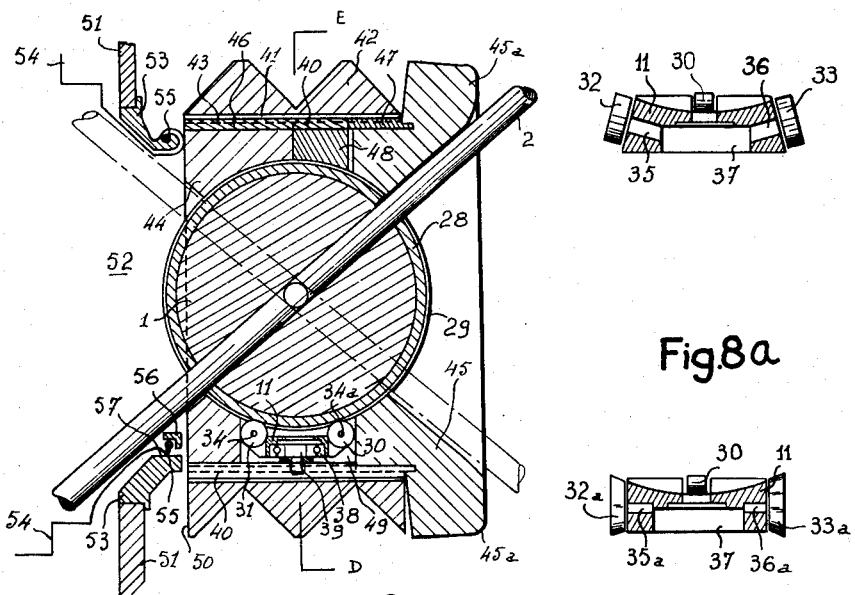
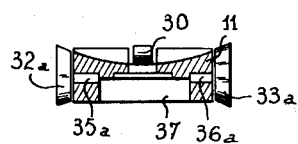
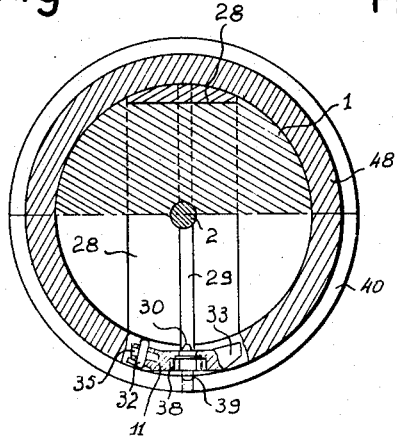
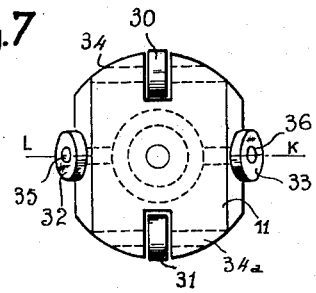

3,082,045
BALL AND SOCKET JOINTS FOR
REMOTE CONTROLS
René Leroy, Clamart, Antoine Fortin, Courbevoie, Jean
Vertut, Paris, and Marcel Fortin, Le Chesnay, France,
assignors to Commissariat a l'Energie Atomique, Paris,
France
Filed June 28, 1960, Ser. No. 39,351
Claims priority, application France July 7, 1959
17 Claims. (Cl. 308—2)

The present invention relates to ball and socket joints for passing controls into sealed walls.

Enclosures are often used in industry, particularly in atomic technology, the walls of which are constituted by constructional materials of various kinds and which should be suitably thick in order to provide efficient protection against nuclear, thermal and other radiations.

Operations within such enclosures, which are initiated from outside, are effected by means of remote controls which pass through the walls of the enclosures, particularly with the aid of ball and socket joints defining the apex of a cone which itself defines the region of effectiveness of the controls.

The original joints made use of for this purpose had certain disadvantages, due principally to distortion of the spherical mountings in which they were carried and also to friction of the joints within their mountings.

The present invention has the object of providing improvements in ball and socket joints for remote controls, which permit virtually all friction to be eliminated and to generise the use of such joints in walls of large thickness.

According to a first embodiment of the invention, the aforesaid improvements consist essentially in that the ball and socket joint comprises a sphere of a radiation-absorbing material surrounded by two casing shells of a hard material, two ball-races provided in the casing which are disposed upon coaxial circles, a shank member traversing the sphere along a diameter to which a control is affixed and four ball-bearings or other support means mounted in a part so as to have their axes parallel to the axis of the circles, the part being mounted upon a thrust bearing or equivalent member and being rotatable about an axis perpendicular to the plane defined by the axes of the ball-bearings.

According to a modified embodiment of the invention, the joint comprises a sphere of lead, a collar of hard material which surrounds a zone of the sphere delimited by two planes parallel to a third plane passing through the centre of the sphere and equidistant therefrom, a ball-race on the collar located in the third plane, a shank member traversing the sphere along a diameter located in the third plane, a part movable on a thrust bearing about a vertical axis situated in the third plane and passing through the centre of the sphere, two ball-bearings having their axes perpendicular to the third plane and carried on the ball-race, and two other ball-bearings having their axes suitably inclined so that the exterior cages of the balls are carried on the collar, the four ball-bearings being disposed so that their centres are located at the ends of a cross having its centre on the axis of rotation of the movable part.

According to a first feature of the invention, in the case of the above-described modified embodiment, the ball-bearings having inclined axes can be replaced by ball-bearings having conical exterior cages and axes parallel to the axes of the two first-mentioned ball-bearings which are carried in the ball-race, thus allowing the second-mentioned ball-bearings to rest on the collar without having inclined axes.

According to a second feature of the invention, the ball and socket joint is located in a casing constituted by two casing shells which screw in known manner into a hole tapped in the protective wall, the internal surfaces of the hole being wholly or partially covered by resistant metal linings, in which the threads are cut. The orifices in the casing shells which form the casing in which the joint is disposed are of conical form, the apex of the cone being directed toward the sphere, and thus permit the control-carrying shank to describe a cone of large apex angle. In fact, if the orifices are cylindrical, the cone described by the control-carrying shank will have much too small an apex angle and, consequently, the zone covering the control-carrying shank will be too limited.

In the first embodiment described above, the ball and socket joint is not demountable from outside and comprises ball or roller bearings the external cages of which are cylindrical. It is clear that such a control can be mounted in a joint casing such as described above, that is, one which is demountable from outside; it can also, in accordance with the invention, be provided with ball or roller bearings having conical external cages. In this case, the bearing raceways will have an appropriately conical form in order to permit bearings with conical exterior cages to rest on the races.

Other characteristics of the invention will be apparent from the following description, given in conjunction with FIGS. 1 to 9 of the accompanying drawings, of ball and socket joints for remote controls in accordance with the invention. In the drawings:

FIG. 1 shows an elevational view in section through the centre of a joint according to the invention consistent with the first embodiment;

FIG. 2 shows a sectional view from above along the line A—B—C of FIG. 1;

FIG. 3 shows an elevational view in section through the centre of a joint according to the invention consistent with the second embodiment;

FIG. 4 shows a transverse section along the line D—E of FIG. 3, the lower half of the sphere not being sectioned;

FIG. 5 shows a plan view of the part supporting the ball-bearings, removed from the control assembly shown in FIG. 1;

FIG. 6 shows a sectional view along the line F—G—H of FIG. 5;

FIG. 7 shows a view of the part supporting the ball-bearings, removed from the control assembly shown in FIG. 3;

FIG. 8 shows a section of FIG. 7 along the line L—K;

FIG. 8a shows a sectional view of a modification of FIG. 8, provided with ball-bearings having conical external cages;

FIG. 9 shows a side view of the lead sphere removed from the joint shown in FIG. 1.

As shown in FIG. 1, an improved ball and socket joint according to a first embodiment of the invention is constituted by a sphere of lead 1 traversed by an operating shank member 2 for a remote control. Two casing shells 3 and 4 of hardened steel are fitted on the sphere 1 and are machined in such a manner as to include two parallel ball-races 5 and 6, shown in FIG. 9. The control is supported by the two races 5 and 6 on four small bearings 7, 8, 9 and 10, upon which it can rotate. Ball bearings can obviously be used in place of the roller bearings which have been illustrated in the drawings. Only two of the bearings are shown in FIG. 1. The four bearings are shown in FIGS. 2 and 5 mounted in a part 11 on spindles 12 and 13 cottered in at 14 and 15 (FIG. 5). The bearings 7 and 9 are mounted on the spindle 12 and the bearings 8 and 10 are mounted on the spindle 13. The part 11 is movable about a vertical spindle 16 secured to a housing 17 (FIGS. 1 and 2). To obtain movement without rubbing between the part 11 and the base 18 of the housing 17, a thrust bearing 19 is located between the lower face 20 of the part 11 and the base surface 18 of the housing 17.

The housing 17 in which the part 11 is movable, the part 11 per se and also the sphere 1, which is movable on the part 11 through the intermediary of the bearings 7, 8, 9 and 10, are mounted in a lead casing 21 sheathed with a hard metal 22 such as steel. The casing 21 is centered in an orifice 23 provided in the protective wall by abutment pins such as 24 and soldered to the latter at 25.

The casing 21 which contains the control assembly is correctly chamfered off at 26 and 27 so as to permit maximum movement, as shown at 2' and 2" in FIG. 1, of the shank 2 of the control.

It is shown in FIGS. 3 and 4 that, as in the first embodiment of the invention, the joint 1 is constituted by a spherical mass of lead, but according to a feature of the present embodiment, the sphere is not encased in a layer of resistant metal. The sphere merely comprises a single covering of hard metal constituted by a shell 28 which is advantageously incorporated in the mass of lead 1 by running the melted mass into a shell mould of which the shell 28 constitutes a temporary closure element. The median plane of the shell 28 contains a great circle of the sphere 1 and, in the embodiment shown, this plane also contains the shank 2 for remotely operating the control, which shank passes diametrically through the joint 1.

In accordance with the invention, the joint includes a single race 29. This raceway 29 is cut into the shell 28 and disposed in the median plane of the shell.

The sphere 1 rests on four bearings 30, 31, 32 and 33 which are carried on a part 1 (FIG. 7). The bearings 30 and 31 are mounted respectively on spindles 34 and 34a (FIGS. 7 and 8) perpendicular to the median plane of the shell 28 and carried in the raceway 29.

The bearings 32 and 33 are mounted on spindles 35 and 36 disposed in a plane perpendicular to the plane which contains the bearings 30 and 31.

The spindles 35 and 36 are disposed symmetrically with respect to the median plane of the raceway 29 and are preferably inclined with respect to such plane, as shown in FIGS. 7 and 8. The part 11 which carries the four bearings comprises a housing 37 in which a thrust bearing is disposed for permitting the bearing-carrying part 11 to pivot about a vertical axis through the centre of the sphere 1 and through the median plane of the raceway 29. The thrust bearing 38 and a screw 39 which connects the part 11 to the wall 42, while allowing it to turn about the axis which has been defined above, are shown in FIGS. 3 and 4.

In FIG. 8a, there are shown, in the case of a modification of the foregoing embodiment, the part 11, the bearing 30 with horizontal axis and two bearings 32a and 33a having exterior cages which are conical and rotate about two uninclined horizontal axes 35a and 36a.

As in the foregoing embodiment, the assembly of the sphere 1, the operating shank 2 and the bearing carrier 11 is located in a casing provided in an orifice 41 in the protective wall 42.

The orifice 41 is encased in a lining 40 of resistant metal, for example, bronze, which carries a screw-thread 43.

The casing per se of the joint comprises two casing shells 44 and 45 of lead surrounded by a hard metal lining 46, such as bronze, which carries a screw-thread 47 thus permitting the shells to screw into the orifice 41.

It should be noted that the shell 45 is provided with a thicker rim 45a, to avoid any escape which might occur through the metallic linings 46 which have a density lower than that of lead.

The lining 46 extends beyond the posterior face of the casing shell 44 to receive in its bore a ring 48 which surrounds the sphere 1 about a zone of the sphere. This ring 48 is cut away in its lower part at 49 to provide a recess for the bearing-carrier assembly 11.

It should be noted that such a joint has the great advantage of being readily demountable, without having to dismantle the protective wall. It is sufficient to unscrew the casing shell 45, withdraw the ring 48, the sphere 1 and the bearing-carrier 11 by unscrewing the screw 39 and the shell 44. A porthole of lead glass, for instance, can then be screwed into the thread 43, to observe the irradiated products.

FIG. 3 also shows the face 50 of the protective wall 42 reinforced by a sealing wall 51 in which is provided an aperture 52 concentric with the outlet aperture for the joint mounting and bordered by an annulus 53 fixed to the wall 51 in a sealed manner. On this annulus is fixed, also in a sealed manner, the posterior rim of a bellows 54, also fixed in a sealed manner to the end (not shown) of the support shank, to ensure operation of the holder without escape of contamination into the enclosure constituted by the wall 51. To this end, the rim of the bellows 54 includes a bead ring 55 which engages in a corresponding groove in the rigid annulus 53 (see the upper part, at the left, of FIG. 3), or also the transverse section of the annulus can have the form shown in the lower part, at the left, of FIG. 3, in which a ring 56 applies the bead 55 of the bellows 54 on to a surface 57 on the annulus 52 in a sealed manner. These two constructional forms are clearly only examples for which various modifications can be substituted, the desired effect being the sealed juncture between the annulus 53 and the corresponding rim of the bellows 54.

What we claim is:

1. A ball and socket joint for remote control, which comprises, in combination in an orifice in a sealing wall, a sphere of radiation absorbent material traversed diametrically by a control-carrying shank member and encased in a casing of hard material, at least one race disposed in the hard casing about a great circle of the sphere, first means on which the sphere is supported and which permit its rotary movement about an axis perpendicular to the plane of the race and passing through the centre of the sphere, second means upon which the sphere is supported through the intermediary of the first means and which permit the assembly of the sphere and the first means to effect rotation about a vertical axis passing through the centre of the sphere and means for permitting disconnection of the joint from the sealing wall without dismantling the wall.

2. A ball and socket joint for remote control in combination in an orifice in a sealing wall, a sphere of radiation absorbent material encased in a casing of hard material, a control-carrying shank member passing diametrically through said sphere, race means disposed in the hard casing symmetrically with respect to a great circle of said sphere, first means supporting said sphere and permitting rotary movement thereof about an axis perpendicular to said race means and passing through the center of said sphere, and second means supporting said sphere through said first means permitting said sphere and said first means to pivot about a vertical axis passing through the center of said sphere.

3. A joint for a remote control according to claim 2, in which the casing comprises two hemispherical shells of hard material entirely surrounding the surface of the sphere.

4. A joint for a remote control according to claim 2, in which the casing is formed with two raceways disposed substantially upon coaxial circles of the same diameter.

5. A joint for a remote control according to claim 1, in which the casing comprises a ring of hard material which surrounds a zone of the sphere delimited by two planes parallel to the vertical plane passing through the centre of the sphere and containing the axis of the control-carrying shank member.

6. A joint for a remote control according to claim 4 in which the casing is formed with a raceway disposed along a great circle which is located in the vertical plane passing through the centre of the sphere and containing the axis of the control-carrying shank member.

7. A joint for a remote control according to claim 6, in which said first means comprises two bearings, the axes of which are perpendicular to the plane which contains the raceway and which rest in the raceway, two other bearings the axes of which are inclined so that the external cages of the bearings are carried on the ring, the four bearings being disposed so that their respective centres are located at the extremities of a cross having its centre on the vertical axis passing through the centre of the sphere and being mounted in a part movable about a vertical axis coincident with the vertical axis passing through the centre of the sphere.

8. A joint for a remote control according to claim 7, in which said second means consists of a thrust bearing located between said first means and the wall of the orifice provided in the sealed wall.

9. A joint for a remote control according to claim 7, in which said second means consists of a needle bearing located between said first means and the surface of the orifice provided in the sealed wall.

10. A joint for a remote control according to claim 2, in which said second means consists of a lubricated bearing located between said first means and the surface of the orifice provided in the sealed wall.

11. A joint for a remote control according to claim 2, in which said first means comprises four bearings mounted in a part so as to have their axes parallel to the axis of the circles according to which the raceways are disposed and disposed in this part so as to be carried in pairs in a raceway providing a polygon of support for the sphere having the form of a rectangle.

12. A joint for a remote control according to claim 11, in which said second means consists of a thrust bearing located between said part and the surface of the orifice provided in the sealed wall.

13. A joint for a remote control according to claim 11, in which said second means consists of a needle bearing located between said part and the surface of the orifice provided in the sealed wall.

14. A joint for a remote control according to claim 11, in which said second means consists of a lubricated bearing located between said part and the wall of the orifice provided in the sealed wall.

15. A joint for a remote control according to claim 1, in which the means for disconnecting the joint from the sealed wall comprise a screw-threaded lining surrounding the surface of the orifice, a first casing shell threaded into the wall and chamfered to permit maximum movement of the control-carrying shank, a second casing shell likewise chamfered and screwed into the experimental side of the wall, the two shells being surrounded by a screw-threaded metallic lining for permitting them to be screwed into the threaded lining connected with the orifice.

16. A joint for a remote control according to claim 2, in which a bellows is fixed to the wall of the shell casing and on the end of the control-carrying shank for preventing escape of contamination.

17. A joint for a remote control according to claim 2, in which the bearings are constituted by roller-bearings.

References Cited in the file of this patent
UNITED STATES PATENTS
521,208     Day et al. _____ June 12, 1894